(12) United States Patent
Akaike et al.

(10) Patent No.: US 7,073,856 B2
(45) Date of Patent: Jul. 11, 2006

(54) HEAD RESTS

(75) Inventors: Fumitoshi Akaike, Nisshin (JP); Seiya Nishimura, Okazaki (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/153,262

(22) Filed: Jun. 15, 2005

(65) Prior Publication Data
US 2005/0280304 A1    Dec. 22, 2005

(30) Foreign Application Priority Data
Jun. 16, 2004    (JP)    ............................ 2004-178204
May 30, 2005    (JP)    ............................ 2005-157328

(51) Int. Cl.
*B60N 2/42*    (2006.01)
(52) U.S. Cl. ............................................. 297/216.12
(58) Field of Classification Search ........... 297/216.12, 297/216.1, 410, 391, 217.3
See application file for complete search history.

(56) References Cited

U.S. PATENT DOCUMENTS

| | | | |
|---|---|---|---|
| 5,975,637 A | * | 11/1999 | Geuss et al. ................. 297/391 |
| 6,149,232 A | * | 11/2000 | Meyer .................... 297/216.12 |
| 6,607,242 B1 | | 8/2003 | Estrada et al. |
| 6,623,073 B1 | * | 9/2003 | Schafer et al. ......... 297/216.12 |
| 6,715,829 B1 | * | 4/2004 | Svantesson et al. ... 297/216.12 |

FOREIGN PATENT DOCUMENTS

| | | |
|---|---|---|
| JP | 2000-233713 | 8/2000 |
| JP | 2000-309242 | 11/2000 |
| JP | 2002-010863 | 1/2002 |
| JP | 2002-142910 | 5/2002 |
| JP | 2004-009891 | 1/2004 |
| JP | 2004-122856 | 4/2004 |
| JP | 2005-013604 | 1/2005 |

\* cited by examiner

*Primary Examiner*—Milton Nelson, Jr.
(74) *Attorney, Agent, or Firm*—Patterson, Thuente, Skaar & Christensen, P.A.

(57) ABSTRACT

A head rest of a vehicle seat may include a main body having a front portion for supporting a head of a passenger and a rear portion that is attached to a head rest stay, a moving mechanism that is arranged and constructed to move the main body or the front portion vertically and to move the front portion back and forth, and a control device that is arranged and constructed to control motions of the moving mechanism. The moving mechanism includes a first moving mechanism for upwardly moving the main body or the front portion and a second moving mechanism for forwardly moving the front portion. The control device controls the motions of the moving mechanism based upon a detection signal that is generated when a vehicle collision is predicted or sensed, so that the second moving mechanism is actuated after the first moving mechanism is actuated.

4 Claims, 13 Drawing Sheets

HEAD RESTS

BACKGROUND OF THE INVENTION

1. Field of the Invention

The present invention relates to head rests of a vehicle seat. More particularly, the present invention relates to head rests of a vehicle seat that can increase restraint performance for heads of passengers when a vehicle collision is sensed or predicted.

2. Description of the Related Art

A head rest of a vehicle seat that can increase restraint performance for a head of a passenger when a vehicle collision is sensed or predicted is already known. Such a head rest (an active head rest) is taught, for example, by Japanese Laid-Open Patent Publication Number 2002-142910.

The known head rest includes two portions, i.e., a forward movable portion and a rearward immovable portion, that are linked to each other via parallel linking members. In the known head rest, when the vehicle collision is sensed by a sensor, the parallel linking members are actuated based on a signal from the sensor so that the movable portion moves forwardly and upwardly from a rest position to a projected position. As a result, the movable portion of the head rest moves closer to the passenger head so that the passenger head can be held by the head rest. Thus, the passenger can be prevented from suffering a whiplash injury.

Typically, during the vehicle collision (in particular, during a back-side collision), the vehicle seat is rotated rearwardly around a rotational axis of a seat reclining mechanism. At this time, the passenger is moved rearwardly while falling backward due to the rotation of the vehicle seat. As a result, the head rest is typically positioned lower than the passenger head.

However, as described above, in the known head rest, the movable portion and the immovable portion are linked via the parallel linking members. Therefore, depending upon the strength of the impact, often times, the movable portion cannot timely or immediately move to a desired height in order to align with the lowered passenger head. Consequently, the passenger head cannot be suitably held by the head rest. This means that the passenger cannot be sufficiently prevented from suffering a whiplash injury.

SUMMARY OF THE INVENTION

It is, accordingly, one object of the present invention to provide improved head rests of a vehicle, in particular, to provide head rests of a vehicle that can achieve good performance when the vehicle is applied with an impact.

For example, in one aspect of the present invention, a head rest of a vehicle seat may include a main body having a front portion for supporting a head of a passenger and a rear portion that is attached to a head rest stay, a moving mechanism that is arranged and constructed to move the main body or the front portion vertically and to move the front portion back and forth (i.e., horizontally), and a control device that is arranged and constructed to control motions of the moving mechanism. The moving mechanism includes a first moving mechanism for upwardly moving the main body or the front portion and a second moving mechanism for forwardly moving the front portion. The control device controls the motions of the moving mechanism based upon a detection signal that is generated when a vehicle collision is predicted or sensed, so that the second moving mechanism is actuated after the first moving mechanism is actuated.

According to the head rest thus constructed, when a vehicle collision is sensed or predicted, the front portion of the head rest main body can timely or immediately move to a desired height in order to align with a head of a passenger. Therefore, the passenger head can be reliably held by the head rest. As a result, the passenger can be effectively prevented from suffering a whiplash injury.

Optionally, the head rest may include a proximity detecting device in order to detect that the front portion of the head rest main body actually contacts or comes closer to the passenger head.

In this case, the head rest can be designed such that the moving mechanism can be stopped in response to a proximity signal from the proximity detecting device. Therefore, it is possible to prevent the front portion of the head rest main body from excessively projecting toward the passenger head.

Other objects, features and advantages of the present invention will be readily understood after reading the following detailed description together with the accompanying drawings and the claims.

BRIEF DESCRIPTION OF THE DRAWINGS

FIG. 13 (B) is a side view of a second modified form of the third embodiment.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 13(B).

First Detailed Representative Embodiment

A first detailed representative embodiment of the present invention is shown in FIGS. 1 to 7.

Figure 1:
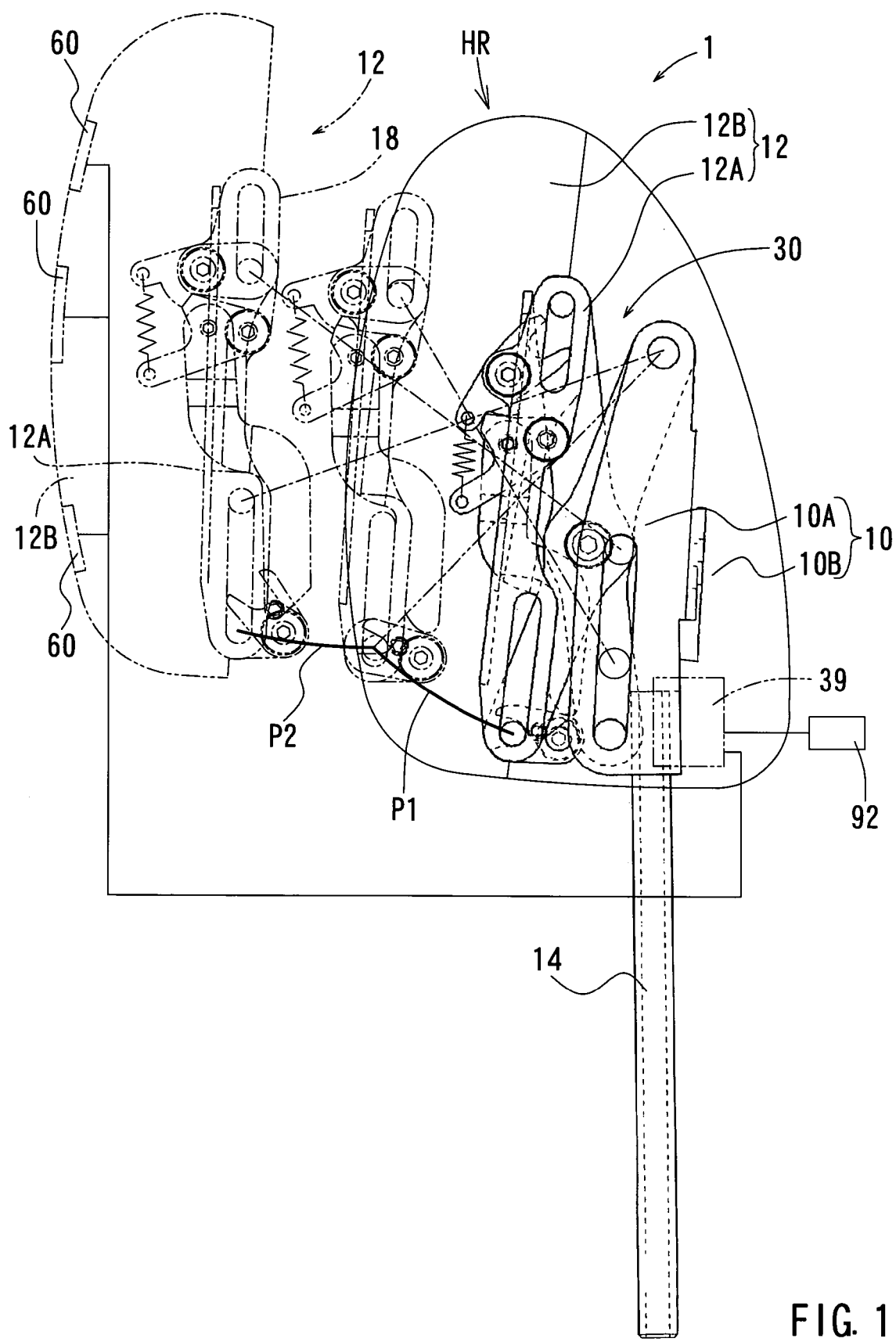
FIG. 1 is a side view of a head rest according to a first embodiment of the present invention, which schematically illustrates a motion of a moving mechanism for moving a front bracket relative to a rear bracket.

As shown in FIG. 1, a representative head rest 1 (an active head rest) includes a main body HR and a pair of head rest stays 14. The head rest stays 14 are vertically movably connected to a seat back (not shown) of a vehicle seat (not shown) so that the head rest 1 is attached to the seat back. The main body HR is composed of two portions, i.e., an immovable rear portion 10 (i.e., a base portion or a first portion), and a movable front portion 12 (i.e., a head support portion or a second portion) that can support the head of a passenger.

The rear portion 10 includes a pair of vertically extending rear brackets 10A and a rear shell 10B. The rear brackets 10A are respectively secured to the head rest stays 14. The rear brackets 10A are encapsulated in the rear shell 10B and is appropriately connected thereto. Also, each of the rear brackets 10A has an elongated vertical guide slot 16 that is formed in a lower portion thereof. Conversely, the front portion 12 includes a laterally extending plate-shaped front bracket 12A and a front shell 12B. The front bracket 12A is encapsulated in the front shell 12B and is appropriately connected thereto. The front bracket 12A is provided with a pair of vertically extending retainer members 18 along both side edges thereof. Each of the retainer members 18 has a vertically elongated guide slot 20 (i.e., a first guide slot) and a vertically elongated guide slot 22 (i.e., a second guide slot) that are respectively formed in the lower and upper portions thereof. As will be appreciated, each of the rear and front shells 10B and 12B may generally include a cushion pad and a covering material (not shown).

The head rest 1 further includes a linking mechanism or a moving mechanism 30 that interconnects the rear bracket 10A and the front bracket 12A such that the front bracket 12A can move vertically and back and forth (i.e., horizontally) relative to the rear bracket 10A. The moving mechanism 30 essentially consists of a pair of cross bar links 31. Each of the cross bar links 31 is composed of outer and inner cross bars 32 and 33 (i.e., first and second cross bars) that are rotatably interconnected via pivot pin 34. The outer cross bars 32 of the respective pairs of cross bar links 31 are rotatably interconnected at their rear and front end portions (i.e., first and second end portions) via a first connector shaft 35 and a second connector shaft 36. Similarly, the inner cross bars 33 of the respective pairs of cross bar links 31 are rotatably interconnected at their rear and front end portions (i.e., first and second end portions) via a first connector shaft 37 and a second connector shaft 38.

Figure 6:
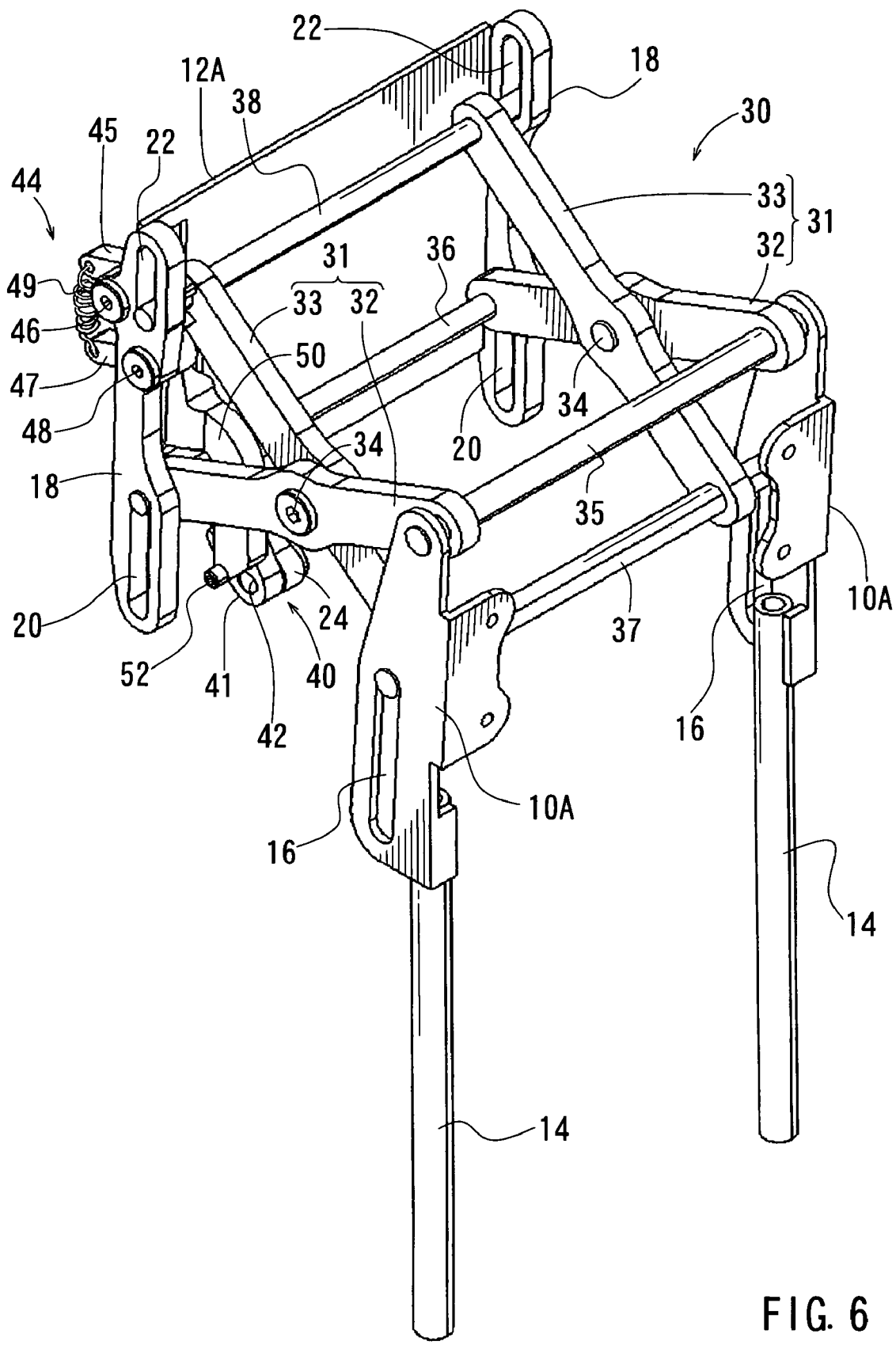
FIG. 6 is a perspective view of the moving mechanism, in which the moving mechanism is seen from left rear.
Figure 7:
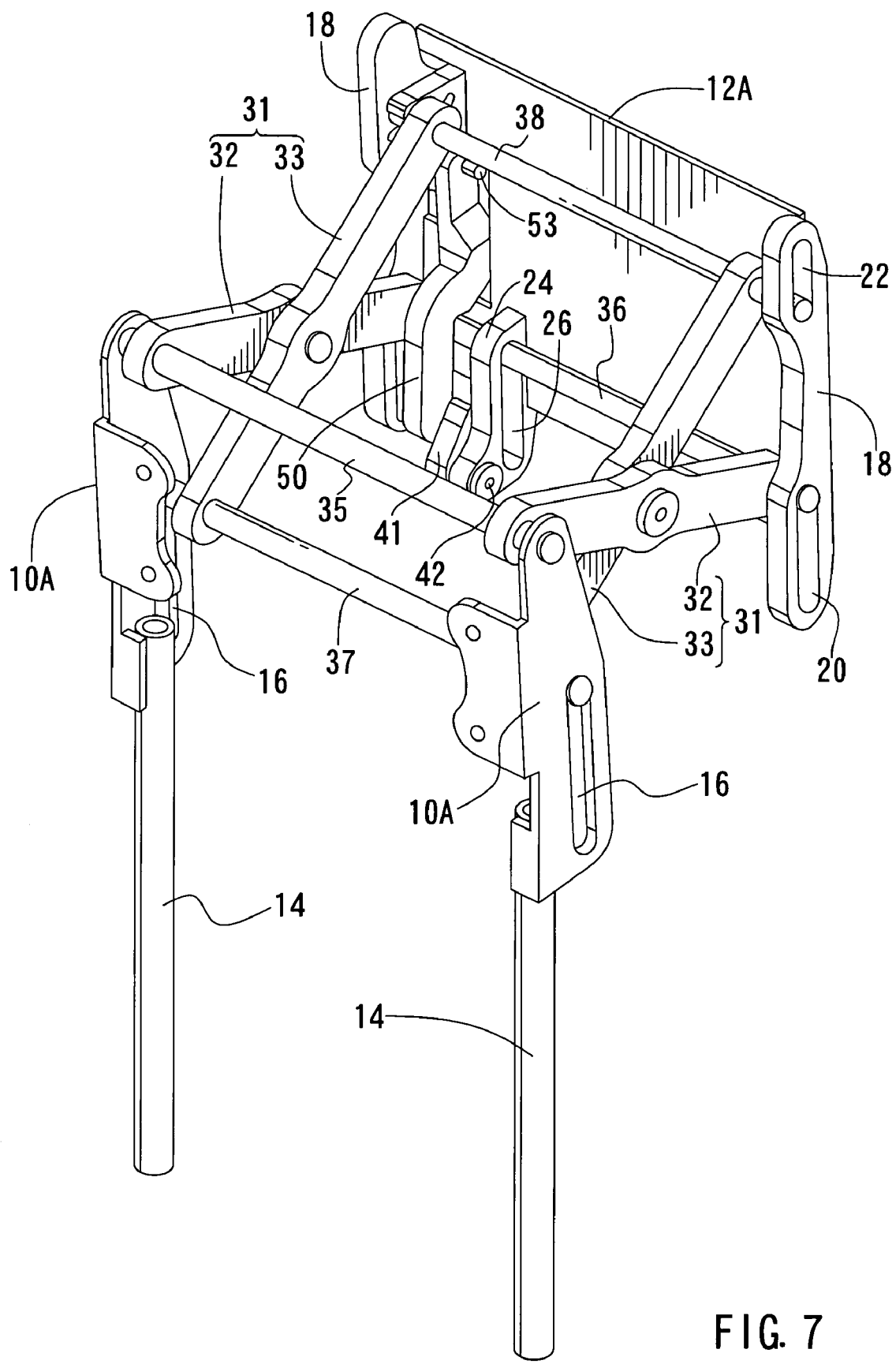
FIG. 7 is a perspective view of the moving mechanism, in which the moving mechanism is seen from right rear.

As best shown in FIGS. 6 and 7, the first connector shaft 35 of the outer cross bars 32 has opposed ends that are respectively movably connected to upper ends of the rear brackets 10A. Also, the first connector shaft 37 of the inner cross bars 33 has opposed ends that respectively rotatably and slidably engage the guide slots 16 formed in the rear brackets 10A. Conversely, the second connector shaft 36 of the outer cross bars 32 has opposed ends that respectively rotatably and slidably engage the guide slots 20 formed in the retainer members 18 of the front brackets 12A. Similarly, the second connector shaft 38 of the inner cross bars 33 has opposed ends that respectively rotatably and slidably engage the guide slots 22 formed in the retainer members 18 of the front brackets 12A. Thus, the rear bracket 10A (the rear portion 10) and the front bracket 12A (the front portion 12) are relatively operably connected.

As a result, the rear end portions (first end portions) of the outer cross bars 32 can simply rotate relative to the rear bracket 10A because the first connector shaft 35 is movably connected to the upper ends of the rear brackets 10A at both ends. Conversely, the front end portions (second end portions) of the outer cross bars 32 can move vertically relative to the lower portion of the retainer members 18 (the lower portion of the front bracket 12A) provided that a first locking mechanism 40 (which will be described hereinafter) is unlocked, because the second connector shaft 36 rotatably and slidably engages the guide slots 20 at both ends. Further, the rear end portions (first end portions) of the inner cross bars 33 can vertically move relative to the rear bracket 10A because the first connector shaft 37 rotatably and slidably engages the guide slots 16 at both ends. Similarly, the front end portions (second end portions) of the inner cross bars 33 can vertically move relative to upper portion of the retainer member 18 (the upper portion of the front bracket 12A) provided that a second locking mechanism 44 (which will be described hereinafter) is unlocked, because the second connector shaft 38 rotatably and slidably engages the guide slots 22 at both ends.

Further, as best shown in FIG. 7, the inner side of the front bracket 12A is provided with an auxiliary retainer member 24. The retainer member 24 has a vertical guide slot 26 corresponding to the guide slots 22 formed in the retainer members 18. The vertical guide slot 26 may preferably be laterally aligned with the guide slots 22. As will be apparent, the guide slot 26 slidably receives the second connector shaft 36 of the outer cross bar 32.

As best shown in FIG. 6, the moving mechanism 30 includes a lower or first locking mechanism 40 that is positioned on the lower portion of the front bracket 12A, an upper or second locking mechanism 44 that is positioned on the upper portion of the front bracket 12A, and an interlinking arm 50 that interconnects the first locking mechanism 40 and the second locking mechanisms 44.

Figure 2:
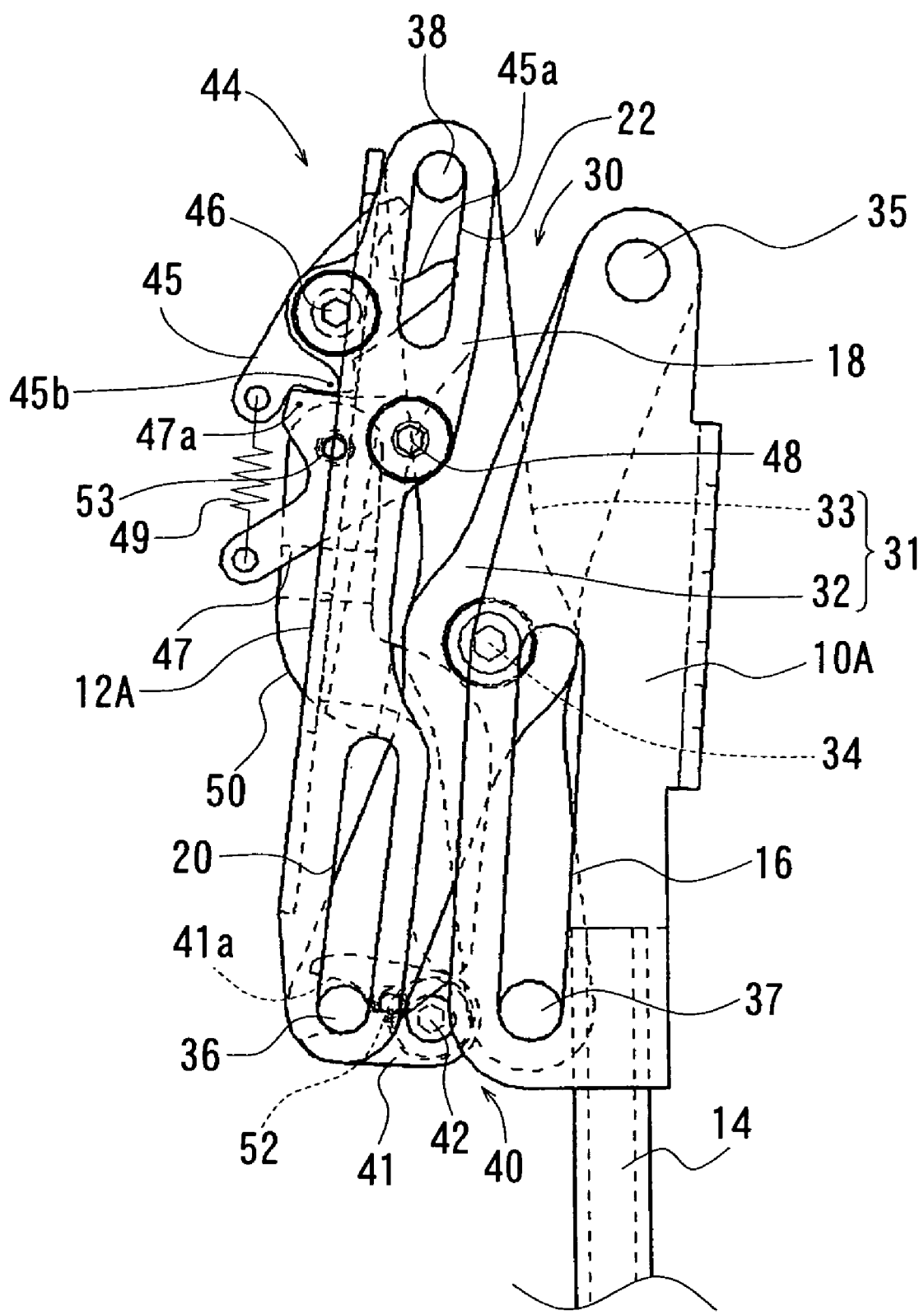
FIG. 2 is a side view of the moving mechanism which is in a retracted condition.
Figure 3:
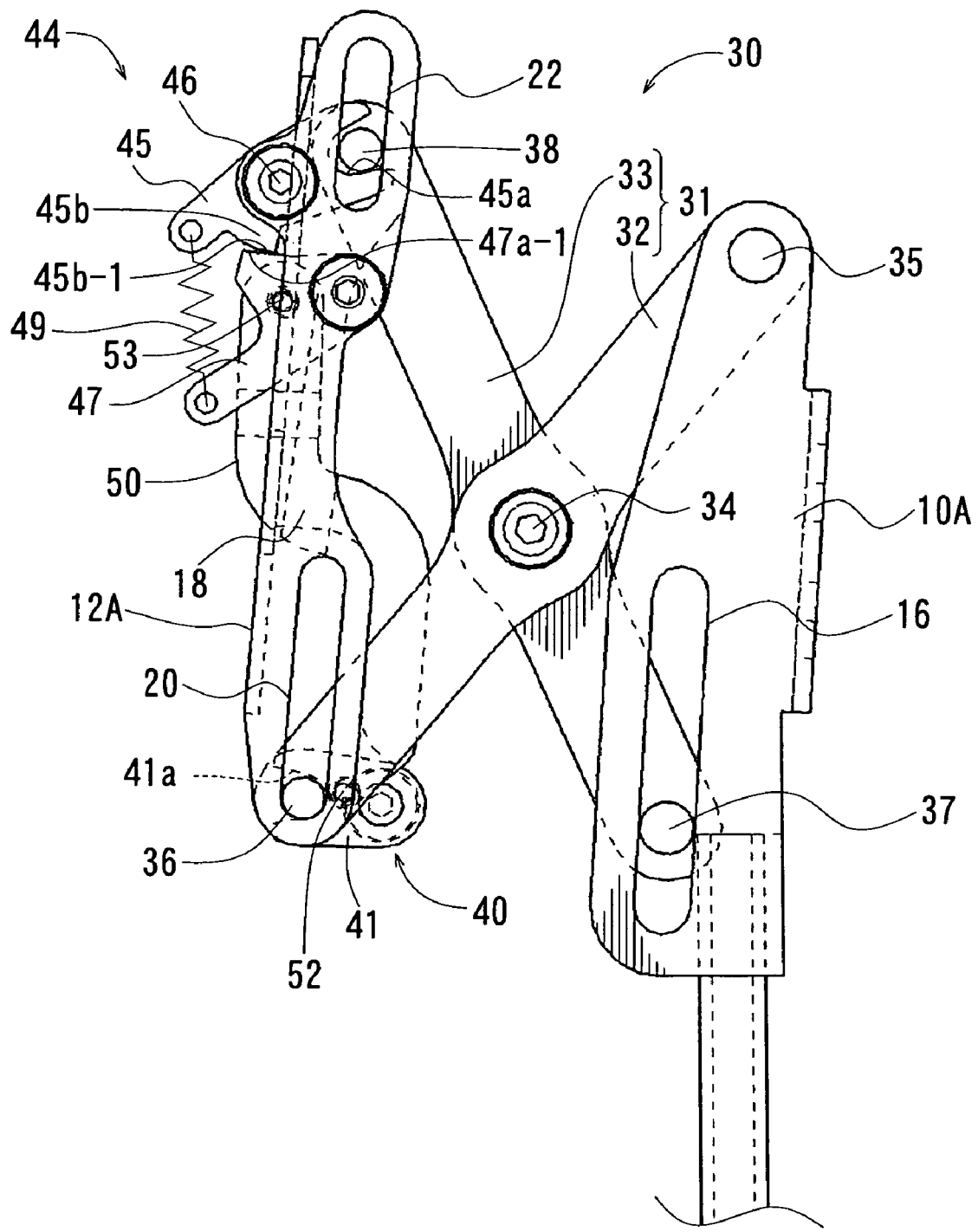
FIG. 3 is a side view of the moving mechanism which is in a first half-projected condition.

As best shown in FIGS. 6 and 7, the first locking mechanism 40 includes a locking member 41 having a proximal portion and a distal portion. The proximal portion of the locking member 41 is rotatably coupled to the lower end of the auxiliary retainer member 24 of the front bracket 12A via a pivot pin 42. The distal portion of the locking member 41 is formed with an engagement recess 41a that is arranged and constructed to engage the second connector shaft 36 of the outer cross bars 32 when the second connector shaft 36 is positioned on the lower end of the guide slots 20 (FIGS. 2 and 3). When the engagement recess 41a of the locking member 41 engages the second connector shaft 36, the second connector shaft 36 can be prevented from upwardly moving or shifting unless the locking member 41 is forced to be rotated around the pivot pin 42. That is, upon engagement of the engagement recess 41a and the second connector shaft 36, the second connector shaft 36 can be prevented from moving along the guide slot 20. As a result, the vertical motion of the front end portions of the outer cross bars 32 can be locked or restricted.

Figure 4:
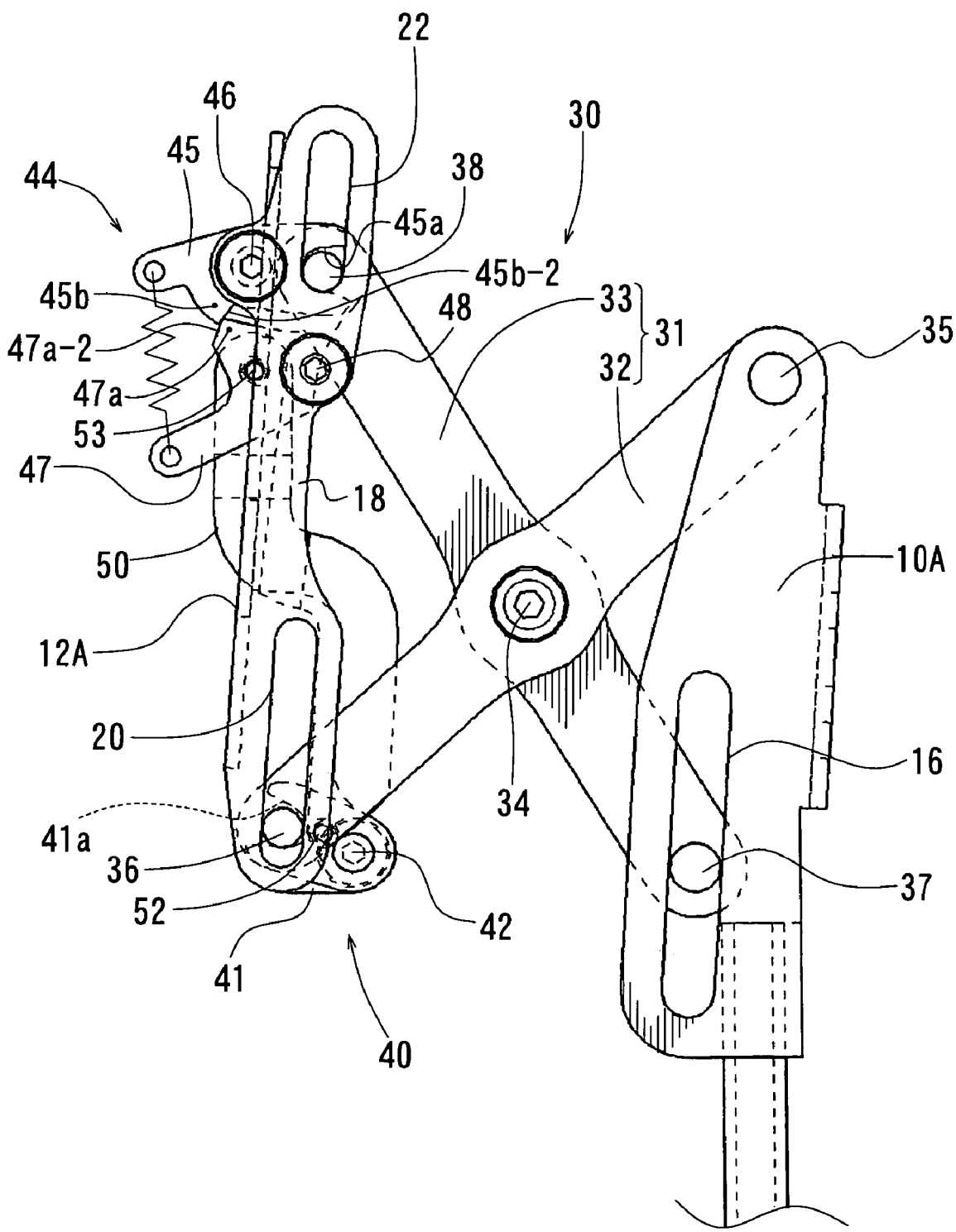
FIG. 4 is a side view of the moving mechanism which is in a second half-projected condition.
Figure 5:
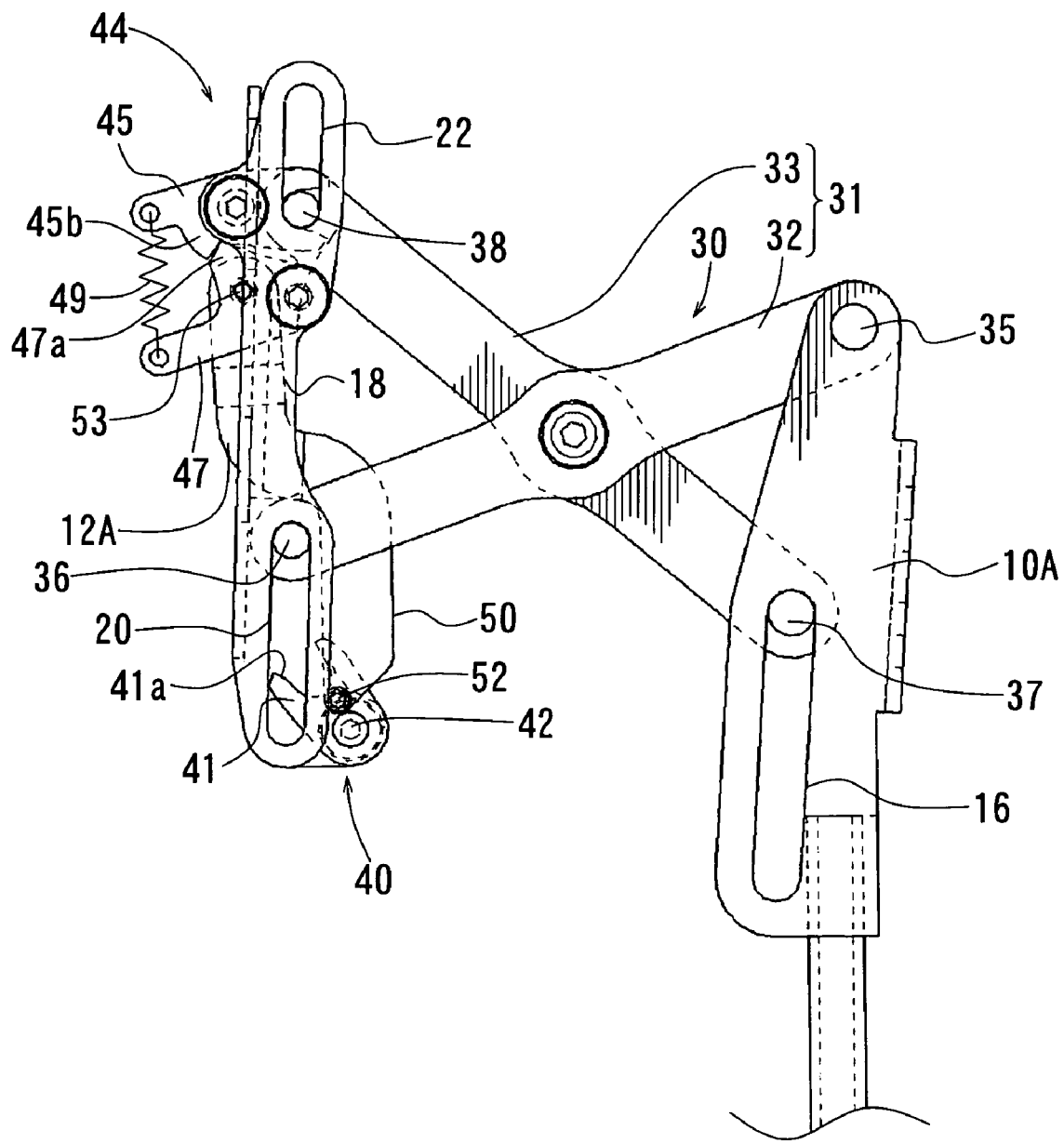
FIG. 5 is a side view of the moving mechanism which is in a fully projected condition.

As best shown in FIG. 6, the second locking mechanism 44 includes a locking member 45 having a front portion, a central portion and a rear portion. The central portion of the locking member 45 is rotatably coupled to the upper end of one of the retainer members 18 of the front bracket 12A via a pivot pin 46. The rear portion of the locking member 45 is formed with an engagement recess 45a that is arranged and constructed to engage the second connector shaft 38 of the inner cross bars 33 when the second connector shaft 38 is positioned on the lower end of the guide slots 22 (FIGS. 4 and 5). When the engagement recess 45a of the locking member 45 engages the second connector shaft 38, the second connector shaft 38 can be prevented from upwardly moving or shifting unless the locking member 45 is forced to be rotated around the pivot pin 46. That is, upon engagement of the engagement recess 45a and the second connector shaft 38, the second connector shaft 38 can be prevented from moving along the guide slot 22. As a result, the vertical motion of the front end portions of the outer cross bars 33 can be locked or restricted. In addition, the locking member 45 is formed with a downwardly extending projection 45b that is positioned between the front and central portions of the locking member 45. The projection 45b has a first engagement surface 45b-1 and a second engagement surface 45b-2.

As best shown in FIG. 6, the second locking mechanism 44 further includes a locking lever 47 disposed under the locking member 45 and having a front portion and a rear portion. The rear portion of the locking lever 47 is rotatably coupled to the retainer member 18 via a pivot pin 48. In addition, the locking lever 47 is formed with an upwardly extending projection 47a that is positioned between the front and rear portions of the locking lever 47. The projection 47a has a first engagement surface 47a-1 and a second engagement surface 47a-2.

Also, the second locking mechanism 44 includes a tension spring 49. The tension spring 49 is positioned between the front portion of the locking member 45 and the front potion of the locking lever 47 and is connected thereto at both ends thereof. As a result, the locking member 45 is normally biased counterclockwise around the pivot pin 46. To the contrary, the locking lever 47 is normally biased clockwise around the pivot pin 48. Further, the projection 45b of the locking member 45 and the projection 47a of the locking lever 47 are arranged and constructed to engage or interact with each other.

As shown in, for example, FIG. 2, the lower end of the interlinking arm 50 is connected to the locking member 41 of the first locking mechanism 40 via a pin 52. Also, the upper end of the interlinking arm 50 is connected to the locking lever 47 of the second locking mechanism 44 via a pin 53. Therefore, the locking member 41 and the locking lever 47 can move or rotate in conjunction with each other.

Moreover, the moving mechanism 30 includes an actuator 39 such as a motor for moving the same. The actuator 39 is coupled to the first connector shaft 37 of the inner cross bar 33 so as to vertically move the same. Also, the actuator 39 is electrically communicated with a sensor 92 (i.e., a main detecting device). The sensor 92 may preferably include a sensor for predicting a vehicle collision and a sensor for sensing the collision.

An example of the sensor for predicting the collision is a vehicle-installed collision prediction system (i.e., a pre-crush safety system). Such a system predicts a back-side collision of a vehicle based upon a distance between the vehicle and a backward vehicle or a relative speed and generates a representative signal (i.e., a detection signal). Another example of the sensor for predicting a collision is an Intelligent Transport System. In addition, an example of a sensor for sensing the collision is a vehicle-installed collision sensor.

Next, an operation of the head rest 1 thus constructed will now be described in detail.

When the head rest 1 is in a normal condition, as shown by a solid line in FIG. 1, the rear portion 10 and the front portion 12 are closed or joined with each other. At this time, as shown in FIG. 2, the moving mechanism 30 is in a retracted condition. In other words, the outer and inner cross bars 32 and 33 of the cross bar links 31 are in a folded condition. In this condition, the outer cross bars 32 are substantially vertically positioned so that the second connector shaft 36 is positioned on the lowermost position within the guide slots 20. Also, the inner cross bars 33 are substantially vertically positioned so that the first connector shaft 37 and the second connector shaft 38 are respectively positioned on the lowermost position within the guide slots 16 and the uppermost position within the guide slots 22.

As best shown in FIG. 2, when the head rest 1 is in a normal condition, the engagement recess 41a of the locking member 41 of the first locking mechanism 40 engages the second connector shaft 36 of the outer cross bars 32. To the contrary, the engagement recess 45a of the locking member 45 of the second locking mechanism 44 does not engage the second connector shaft 38 of the inner cross bars 33. Further, in the second locking mechanism 44, the first engagement surface 45b-1 of the projection 45b of the locking member 45 contacts the first engagement surface 47a-1 of the projection 47a of the locking lever 47 by means of the spring force of the tension spring 49. Therefore, the locking member 45 and the locking lever 47 are prevented from rotating relative to each other. As a result, the locking member 41 of the first locking mechanism 40 is prevented from rotating because the locking member 41 is associated with the locking member 47 via the interlinking arm 50. Thus, the first locking mechanism 40 is in a locking condition in which the vertical motion of the second connector shaft 36 can be locked or restricted (i.e., the front end portions of the outer cross bars 32 are in a locked condition). Conversely, the second locking mechanism 44 is in an unlocking condition in which the vertical motion of the second connector shaft 38 can be permitted (i.e., the front end portions of the inner cross bars 33 are in an unlocked condition).

When a vehicle collision is sensed or predicted by the sensor 92, the actuator 39 is actuated based on the signal from the sensor 92 so that the first connector shaft 37 of the inner cross bars 33 is pushed upwardly. At this time, as shown in FIG. 3, the first connector shaft 37 moves upwardly along the guide slots 16 of the rear brackets 10A. As a result, the inner cross bars 33 rotate counterclockwise around the pivot pins 34 while moving upwardly. Depending upon this motion of the inner cross bars 33, the outer cross bars 32 rotate clockwise about the first connector shaft 35. At this time, the second connector shaft 36 of the outer cross bars 32 is held in the lowermost position within the guide slots 20 because the engagement recess 41a of the locking member 41 of the first locking mechanism 40 engages the second connector shaft 36. Conversely, the second connector shaft 38 of the inner cross bars 33 is shifted downwardly along the guide slots 22. At this time, the second connector shaft 38 partially engages the engagement recess 45a of the locking member 45 of the second locking mechanism 44 so that the locking member 45 is rotated clockwise about the pivot pin 46 against the spring force of the tension spring 49. Thus, the moving mechanism 30 is shifted to a first half-extended condition (which corresponds to a position shown in FIG. 3).

When the first connector shaft 37 of the inner cross bars 33 is further pushed upwardly along the guide slots 16 of the rear brackets 10A by means of the actuator 39, the inner cross bars 33 further rotate counterclockwise around the pivot pins 34 while moving upwardly so that the second connector shaft 38 of the inner cross bars 33 is further shifted downwardly along the guide slots 22. As a result, the locking member 45 of the second locking mechanism 44 is further rotated clockwise about the pivot pin 46 toward a locking position. As shown in FIG. 4, when the second connector shaft 38 is moved to the lowermost position, the first engagement surface 45b-1 of the projection 45b of the locking member 45 is disengaged from the first engagement surface 47a-1 of the projection 47a of the locking lever 47 so that the second engagement surface 45b-2 of the projection 45b engages the second engagement surface 47a-2 of the projection 47a. As a result, the locking member 45 can be prevented from rotating counterclockwise so that the second locking mechanism 44 is shifted to a locking condition in which the second connector shaft 38 is locked or retained in the lowermost position within the guide slots 22 (i.e., the front end portions of the inner cross bars 33 are in a locked condition). Thus, the moving mechanism 30 is shifted to a second half-extended condition (which substantially corresponds to a position shown in FIG. 4).

Further, at this time, the locking lever 47 can rotate clockwise about the pivot pin 48 while contacting the second engagement surface 47a-2 of the projection 47a with the second engagement surface 45b-2 of the projection 45b. Therefore, the locking member 41 of the first locking mechanism 40 can rotate clockwise because the locking member 41 is connected to the locking lever 47 via the interlinking arm 50. As a result, the first locking mechanism 40 is shifted to an unlocking condition in which the second connector shaft 36 can be disengaged from the engagement recess 41a of the locking member 41 so as to be moved upwardly along the guide slots 20 (i.e., the front end portions of the outer cross bars 32 are in an unlocked condition).

When the first connector shaft 37 of the inner cross bars 33 is still further pushed upwardly along the guide slots 16 of the rear brackets 10A by means of the actuator 39, the inner cross bars 33 further rotate counterclockwise around the pivot pins 34 while moving upwardly. Depending upon this motion of the inner cross bars 33, the outer cross bars 32 rotate clockwise about the first connector shaft 35 so that the second connector shaft 36 of the outer cross bars 32 is moved upwardly along the guide slots 20. At this time, the second connector shaft 38 is held in the lowermost position within the guide slots 22 by the second locking mechanism 44. As shown in FIG. 5, when the first connector shaft 37 is shifted to the uppermost position within the guide slots 16, the second connector shaft 36 is also shifted the uppermost position within the guide slots 20. Thus, as shown in FIG. 5, the moving mechanism 30 is shifted to a fully extended condition.

When the moving mechanism 30 is shifted from the retracted condition to the fully extended condition, the front bracket 12A moves from a normal position (FIG. 2) to a projected position (FIG. 5). As will be apparent from comparing FIG. 2 and FIG. 5, at this time, the front bracket 12A moves forwardly and upwardly relative to the rear bracket 10A. Consequently, as shown by a broken line in FIG. 1, the front portion 12 of the head rest main body HR is projected forwardly and upwardly relative to the rear portion 10 of the head rest main body HR. In other words, the front portion 12 is projected forwardly and upwardly relative to the vehicle seat.

Further, as shown in FIG. 1, the front bracket 12A (the front portion 12) moves forwardly and upwardly relative to the rear bracket 10A (the rear portion 10) by a two-stage motion. That is, the front bracket 12A moves along a first moving path P1 and a subsequent second moving path P2. The first moving path P1 corresponds to a period before the first locking mechanism 40 is switched to the unlocking condition and the second locking mechanism 44 is switched to the locking condition (i.e., a period before the first engagement surface 45b-1 of the projection 45b of the locking member 45 is disengaged from the first engagement surface 47a-1 of the projection 47a of the locking lever 47 so that the second engagement surface 45b-2 of the projection 45b engages the second engagement surface 47a-2 of the projection 47a). Conversely, the first moving path P2 corresponds to a period after the first locking mechanism 40 is switched to the unlocking condition and the second locking mechanism 44 is switched to the locking condition.

As will be appreciated, such a two-stage motion of the front bracket 12A can be performed by the first and second locking mechanisms 40 and 44. That is, the first and second locking mechanisms 40 and 44 function as "a switching device or a control device" that can control the motion of the moving mechanism 30 so as to change the motion of the front bracket 12A relative to the rear bracket 10A when the front bracket 12A is shifted from the normal position to the projected position. As will be apparent from FIG. 1, in the first moving path P1, the front bracket 12A is lifted to a predetermined height while moving forwardly. Conversely, in the second moving path P2, the front bracket 12A linearly moves forwardly while substantially keeping the same height.

According to the moving mechanism 30 having the control device thus constructed, the front bracket 12A can be immediately raised along the first moving path P1 when a vehicle collision happens. Therefore, the front portion 12 of the head rest main body HR can timely or immediately move to a desired height in order to align with the passenger head. Consequently, the passenger head can be suitably and reliably supported by the front portion 12 of the head rest main body HR.

In addition, after the front bracket 12A is raised to the predetermined height, the front bracket 12A can substantially linearly move forwardly along the second moving path P2 toward the passenger head. Therefore, the passenger head can be prevented from rubbing the front portion 12 of the head rest main body HR.

As shown in FIG. 1, the front shell 12B of the front portion 12 may preferably includes a plurality of proximity detectors 60 (i.e., proximity detecting devices) that are embedded therein. The proximity detectors 60 can detect when the front portion 12 contacts or comes closer to the passenger head and generate representative proximity signals. The proximity detectors 60 may preferably be electrically communicated with the actuator 39 so that the moving mechanism 30 can be stopped in response to the proximity signals from the proximity detectors 60 before the motion of the front bracket 12A along the second moving path P2 is completed. Therefore, the front portion 12 of the head rest main body HR can be effectively prevented from excessively projecting forwardly toward the passenger head. Further, because the front bracket 12A substantially linearly moves in the second moving path P2, the sensitivity of the proximity detectors 60 can be stabilized.

Examples of the proximity detectors 60 are touch sensors and capacitance type sensors. As will be appreciated, the touch sensors may include electrodes that can contact each other when the front portion 12 contacts the passenger head. Conversely, the capacitance type sensors may detect a change in capacitance when the front portion 12 comes closer to the passenger head.

As will be understood, the first moving path P1 can be modified by changing the length of the guide slot 22. To the contrary, the first moving path P2 can be modified by changing the length of the guide slot 20.

Also, the moving mechanism 30 can be controlled so as to be stopped when the front portion 12 of the head rest main body HR is vertically aligned with the passenger head, if necessary. In other words, the moving mechanism 30 is controlled so as to be stopped when the motion of the front bracket 12A along the first moving path P1 is completed. In this case, the motion of the front bracket 12A along the second moving path P2 is omitted.

Second Detailed Representative Embodiment

Figure 8:
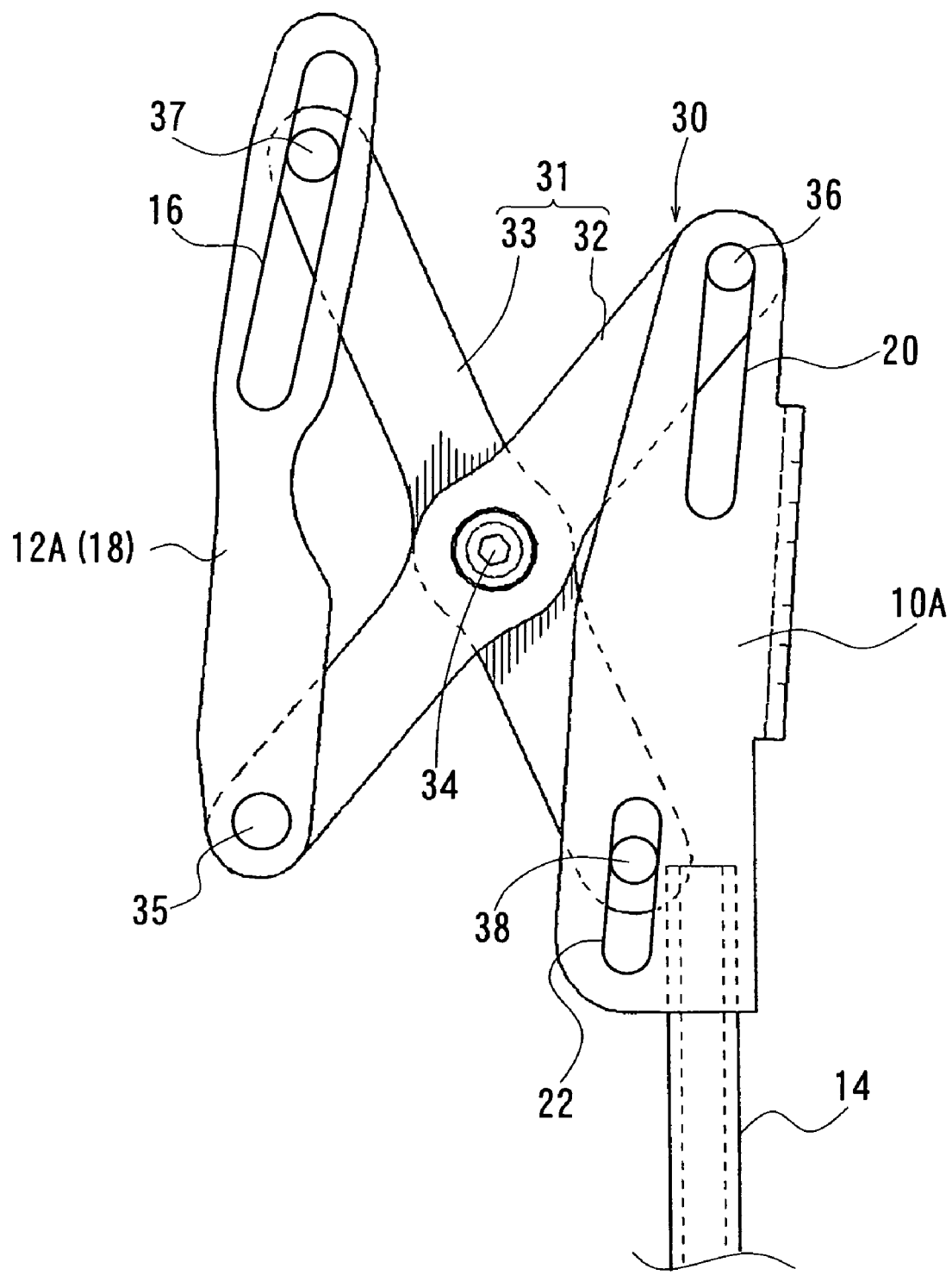
FIG. 8 is a side view similar to FIG. 3, which illustrate a moving mechanism of a head rest according to a second embodiment of the present invention.

The second detailed representative embodiment will now described with reference to FIG. 8.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, each of the rear brackets 10A has the elongated vertical guide slot 20 (i.e., the first guide slot) and the elongated vertical guide slot 22 (i.e., the second guide slot) that are respectively formed in the upper and lower portions thereof. Also, each of the retainer members 18 (the front bracket 12A) has the elongated vertical guide slot 16 that is formed in an upper portion thereof.

Similar to the first embodiment, the moving mechanism 30 essentially consists of a pair of cross bar links 31. Each of the cross bar links 31 is composed of the outer and inner cross bars 32 and 33 that are rotatably interconnected via the pivot pin 34. In this embodiment, the outer cross bars 32 of the respective pairs of cross bar links 31 are rotatably interconnected at their front and rear end portions (i.e., first and second end portions) via the first connector shaft 35 and the second connector shaft 36. Similarly, the inner cross bars 33 of the respective pairs of cross bar links 31 are rotatably interconnected at their front and rear end portions (i.e., first and second end portions) via the first connector shaft 37 and the second connector shaft 38.

Unlike the first embodiment, the first connector shaft 35 has opposed ends that are respectively movably connected to lower ends of the retainer member 18. Also, the first connector shaft 37 has opposed ends that respectively rotatably and slidably engage the guide slots 16 formed in the retainer member 18. Conversely, the second connector shaft 36 has opposed ends that respectively rotatably and slidably engage the guide slots 20 formed in the rear brackets 10A. Similarly, the second connector shaft 38 has opposed ends that respectively rotatably and slidably engage the guide slots 22 formed in the rear brackets 10A. Thus, the rear brackets 10A (the rear portion 10) and the front bracket 12A (the front portion 12) are relatively operably connected.

In this embodiment, the moving mechanism 30 includes a first locking mechanism (not shown), a second locking mechanism (not shown) and an interlinking arm (not shown) that respectively have the same construction and function as in the first and second locking mechanisms 40 and 44 and the interlinking mechanism 50 in the first embodiment. However, unlike the first embodiment, the first locking mechanism is positioned on the upper portion of one of the rear brackets 10A. Also, the second locking mechanism is positioned on the lower portion of one of the rear brackets 10A.

As a result, the rear end portions (second end portions) of the outer cross bars 32 can vertically move relative to the upper end of the rear bracket 10A provided that the first locking mechanism is in the unlocking condition. Conversely, the front end portions (first end portions) of the outer cross bars 32 can simply rotate relative to the retainer members 18 (the lower portion of the front bracket 12A). Further, the rear end portions (second end portions) of the inner cross bars 33 can vertically move relative to the rear bracket 10A provided that the second locking mechanism is in the unlocking condition. Similarly, the front end portions (first end portions) of the inner cross bars 33 can vertically move relative to the retainer member 18 (the upper portion of the front bracket 12A).

According to this embodiment, when a vehicle collision is sensed or predicted, the connector shaft 37 is pushed downwardly by the actuator. As a result, the moving mechanism 30 is shifted from the retracted condition to the fully extended condition so that the front bracket 12A can move from the normal position to the projected position along two different moving paths similar to the first and second moving paths P1 and P2 of the first embodiment.

Third Detailed Representative Embodiment

The third detailed representative embodiment will now described with reference to FIGS. 9 to 12.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, a head rest 101 includes a main body HR and a pair of head rest stays 14. The head rest stays 14 are vertically movably connected to a frame 65 of a seat back 64 of a vehicle seat (not shown) via head rest supports 66 so that the head rest 101 is attached to the seat back 64. The main body HR is composed of two portions, i.e., an immovable rear portion 10 (i.e., a first portion), and a movable front portion 12 (i.e., a second portion) that can hold a head of a passenger. The rear portion 10 includes a pair of rear brackets 10A and a rear shell 10B. Each of the rear brackets 10A has an elongated vertical guide slot 116 that is formed in a lower portion thereof. The front portion 12 includes a front bracket 12A and a front shell 12B. The front bracket 12A is provided with a pair of retainer members 18. Each of the retainer members 18 has an elongated vertical guide slot 120 that is formed in a lower portion thereof.

Similar to the first embodiment, the head rest 101 includes a moving mechanism 130. In this embodiment, unlike the first embodiment, the moving mechanism 130 is composed of a back and forth moving mechanism, i.e., a first moving mechanism 70, and a vertical moving mechanism, i.e., a second moving mechanism 80. The moving mechanism 130 of this embodiment is a combination of the first and second moving mechanisms 70 and 80.

The first moving mechanism 70 essentially consists of a pair of cross bar links 71. Each of the cross bar links 71 is composed of outer and inner cross bars 72 and 73 that are rotatably interconnected via a pivot pin 74. In this embodiment, the outer cross bars 72 of the respective pairs of cross bar links 71 are rotatably interconnected at their rear and front end portions (i.e., first and second end portions) via a first connector shaft 75 and a second connector shaft 76. Similarly, the inner cross bars 73 of the respective pairs of cross bar links 71 are rotatably interconnected at their rear and front end portions (i.e., first and second end portions) via a first connector shaft 77 and a second connector shaft 78.

The first connector shaft 75 has opposed ends that are respectively rotatably connected to upper ends of the rear brackets 10A. Also, the first connector shaft 77 has opposed ends that respectively slidably engage the guide slots 116 formed in the rear brackets 10A. Conversely, the second connector shaft 76 has opposed ends that respectively slidably engage the guide slots 120 formed in the retainer members 18. Also, the second connector shaft 78 has opposed ends that are respectively movably connected to upper ends of the retainer members 18. Thus, the rear brackets 10A (the rear portion 10) and the front bracket 12A (the front portion 12) are relatively operably connected.

Further, in this embodiment, the first moving mechanism 70 is not provided with locking mechanisms that correspond to the first and second locking mechanisms 40 and 44 as in the first embodiment.

The first moving mechanism 70 further includes an actuator 79 such as a motor for moving the same. The actuator 79 is coupled to the first connector shaft 77 of the inner cross bar 73 so as to vertically move the same. Also, the actuator 79 is electrically communicated with an electric control unit 90 (i.e., a switching device or a control device) that is electrically communicated with the sensor 92. Further, the control unit 90 may preferably be electrically communicated with the proximity detectors 60 that are embedded in the front portion 12 of the head rest 101.

Figure 9:
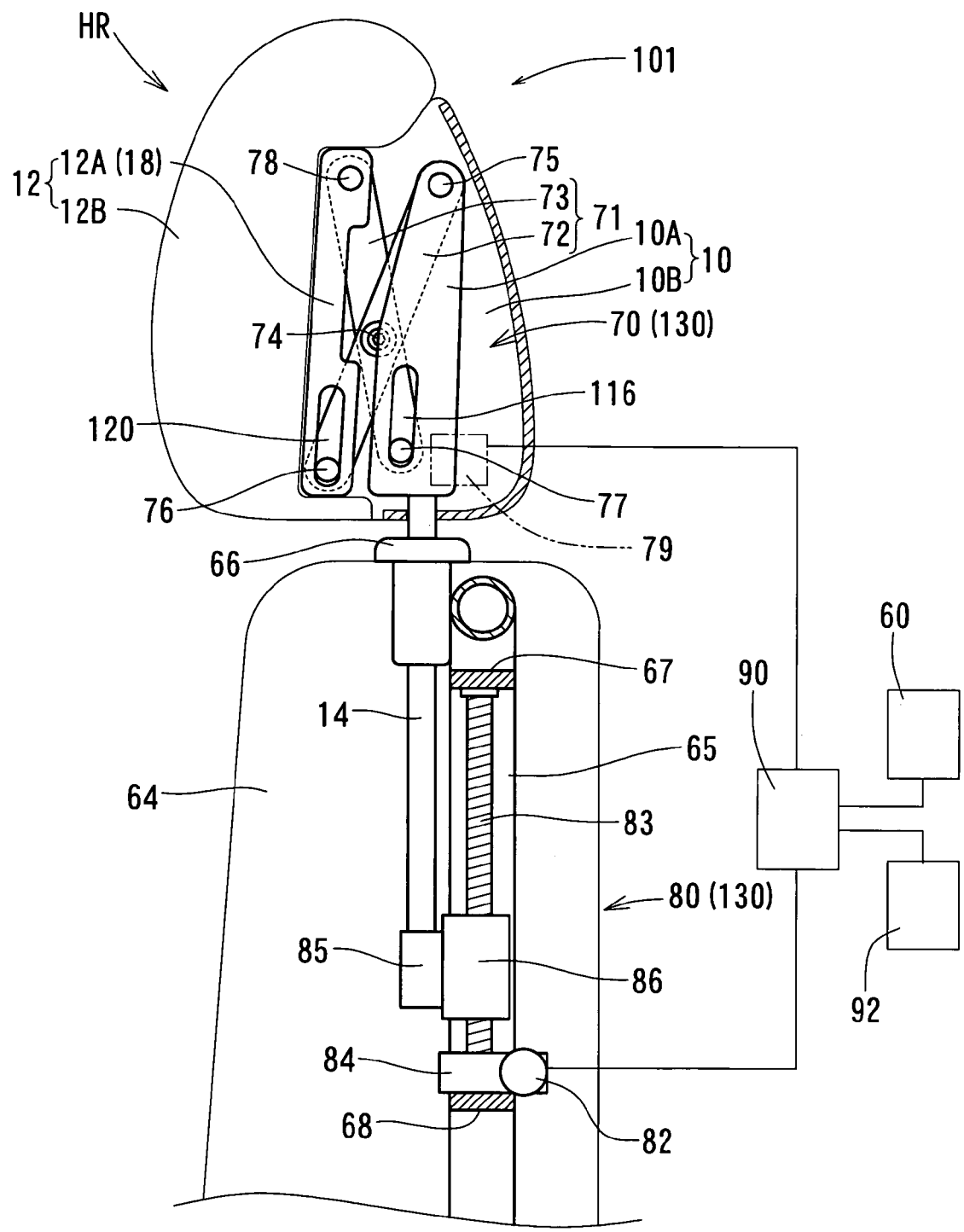
FIG. 9 is a side view of a moving mechanism (a back and forth moving mechanism and a vertical moving mechanism) of a head rest according to a third embodiment of the present invention.
Figure 10:
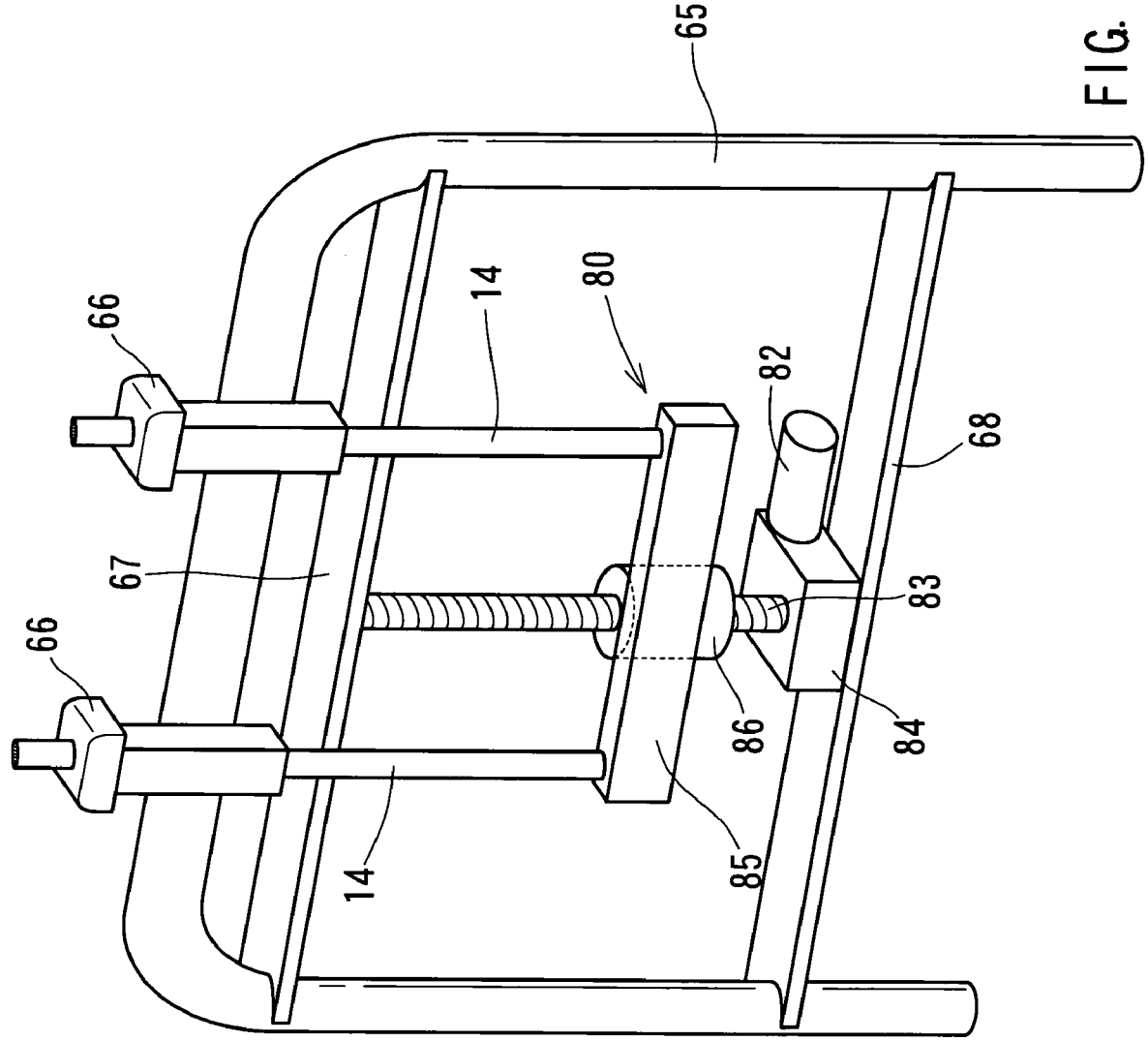
FIG. 10 is a perspective view of the vertical moving mechanism.

As shown in FIGS. 9 and 10, the second moving mechanism 80 essentially consists of a drive unit and a transmission unit. The drive unit includes a drive motor 82 (i.e., an actuator) and a gear box 84 coupled to the drive motor 82. The drive motor 82 is electrically communicated with the control unit 90. The gear box 84 is attached to a lower retainer plate 68 that is connected to the seat back frame 65. The transmission unit includes a vertical threaded shaft 83 and a movable nut 86 positioned on the shaft 83. The lower end of the threaded shaft 83 threadably engages the gear box 84 so that the shaft 83 can be rotated by the drive motor 82. Also, the upper end of the threaded shaft 83 is rotatably connected to an upper retainer plate 67 that is connected to the seat back frame 65. In addition, the movable nut 86 is connected to a holder 85 that is connected to the lower ends of the head rest stays 14.

In the second moving mechanism 80 thus constructed, when the drive motor 82 is driven based on the signal from the sensor 92, the shaft 83 is rotated via the gear box 84. As a result, the nut 86 and the holder 85 are vertically shifted so that the head rest stays 14 vertically move relative to the seat back frame 65. Thus, the main body HR of the head rest 101 vertically moves relative to the seat back 64 so that the height thereof can be changed or adjusted.

Figure 11:
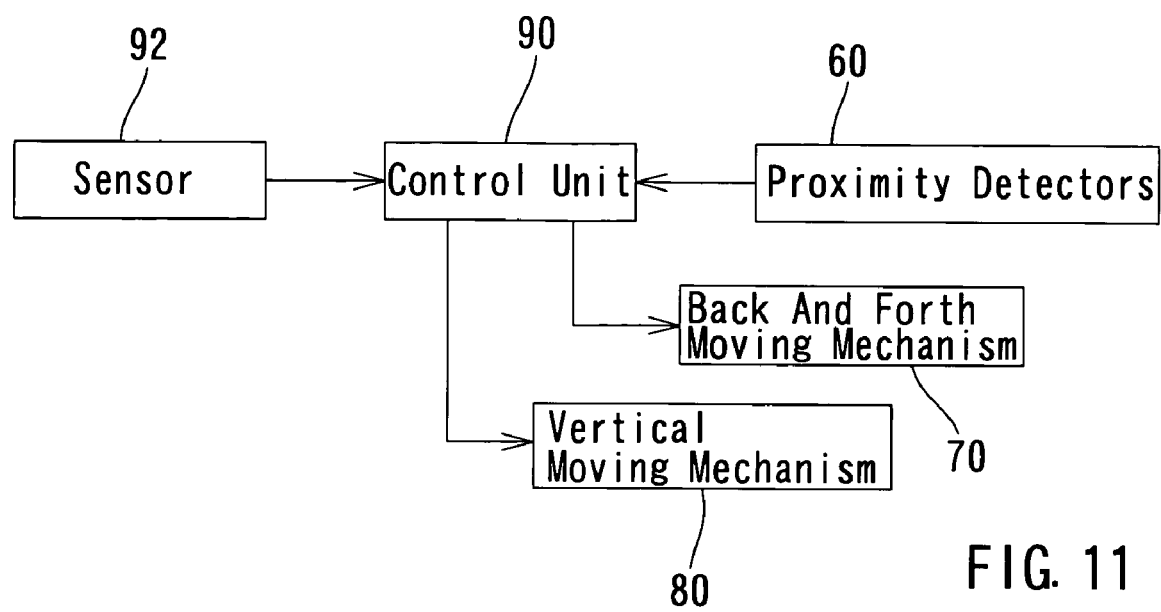
FIG. 11 is a block diagram illustrating a controlling system of the back and forth moving mechanism and the vertical moving mechanism.

Next, an operation of the head rest 101 thus constructed will now be described in detail with reference to FIGS. 9 and 11.

When the head rest 101 is in a normal condition, as shown in FIG. 9, the rear portion 10 and the front portion 12 are closed or joined with each other. At this time, the first moving mechanism 70 and the second moving mechanism 80 are respectively in a retracted condition (i.e., an initial condition) and a lowered condition (i.e., an initial condition).

When a vehicle collision is sensed or predicted by the sensor 92 and the detection signal is transmitted to the control unit 90, the drive motor 82 of the second moving mechanism 80 is first driven based on the signal from the sensor 92 so that the shaft 83 is rotated via the gear box 84. As a result, the nut 86 and the holder 85 are vertically shifted so that the head rest stays 14 move upwardly relative to the seat back frame 65. Therefore, the second moving mechanism 80 is shifted from the lowered condition (FIG. 9) to a lifted condition (not shown). Thus, the main body HR (the front portion 12) of the head rest 101 is upwardly shifted relative to the seat back 64. As a result, the main body HR is lifted to a predetermined height.

Thereafter, the actuator 79 of the first moving mechanism 70 is actuated based on the signal from the sensor 92. When the actuator 79 is actuated, the rear connector shaft 77 of the inner cross bar 73 is pushed upwardly so as to move upwardly along the guide slot 116. As a result, the inner cross bars 73 rotate counterclockwise around the pivot pins 74. Depending upon this motion of the inner cross bars 73, the outer cross bars 72 rotate clockwise about the first connector shaft 75. At this time, the second connector shaft 76 of the outer cross bars 72 moves upwardly along the guide slots 120 formed in the retainer members 18. Thus, the first moving mechanism 70 is shifted from the retracted condition (FIG. 9) to an extended condition (not shown) so that the front bracket 12A moves from the normal position to the projected position. Thus, the front portion 12 of the head rest main body HR projects forwardly toward the passenger head. As will be recognized, unlike the first embodiment, the front bracket 12A substantially linearly moves forwardly from the normal position while substantially maintaining a height. That is, the front bracket 12A substantially linearly and horizontally moves along a moving path that is similar to the second moving path P2 in the first embodiment.

Thus, the main body front portion 12 is upwardly shifted relative to the seat back 64. Thereafter, the front portion 12 is projected forwardly relative to the rear portion 10. As a result, the front portion 12 moves forwardly and upwardly relative to the vehicle seat.

Further, similar to the first embodiment, when the proximity signals from the proximity detectors 60 are transmitted to the control unit 90, the actuator 79 may preferably be deenergized based upon the proximity signals. Thus, the first moving mechanism 70 can be appropriately stopped before reaching the fully extended condition. Therefore, the front portion 12 of the head rest main body HR can be effectively prevented from excessively projecting toward the passenger head.

Next, a process for controlling the moving mechanism 130 (the first moving mechanism 70 and the second moving mechanism 80) by the control unit 90 based upon the detection signal from the sensor 92 and the proximity signals from the proximity detectors 60 will now be described in detail with reference to FIG. 12. Typically, a controlling process by the control unit 90 is started when an ignition switch is turned ON. Also, the controlling process is repeated in a desired time interval.

Figure 12:
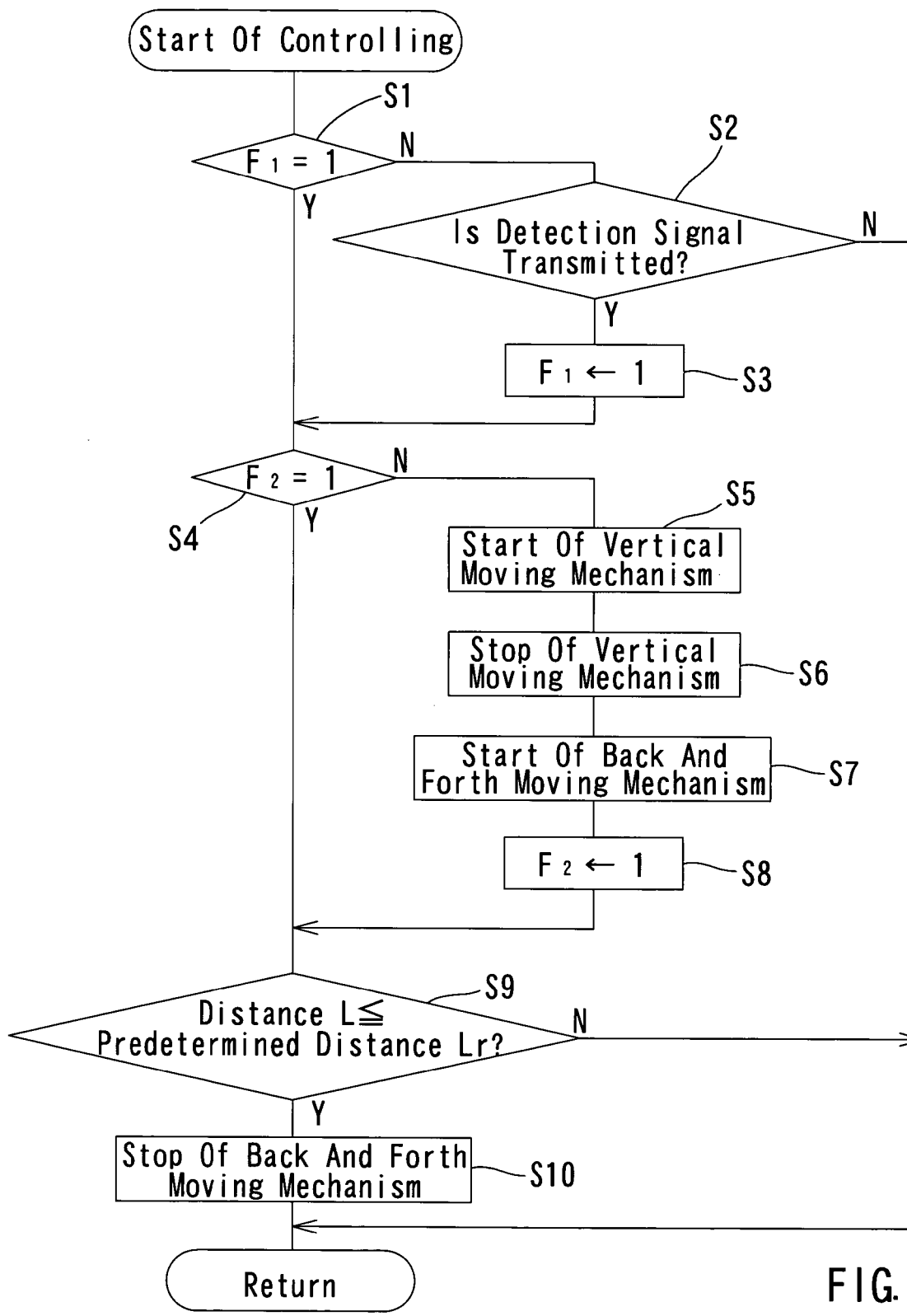
FIG. 12 is a block diagram illustrating a controlling process of the back and forth moving mechanism and the vertical moving mechanism.
Figure 13:
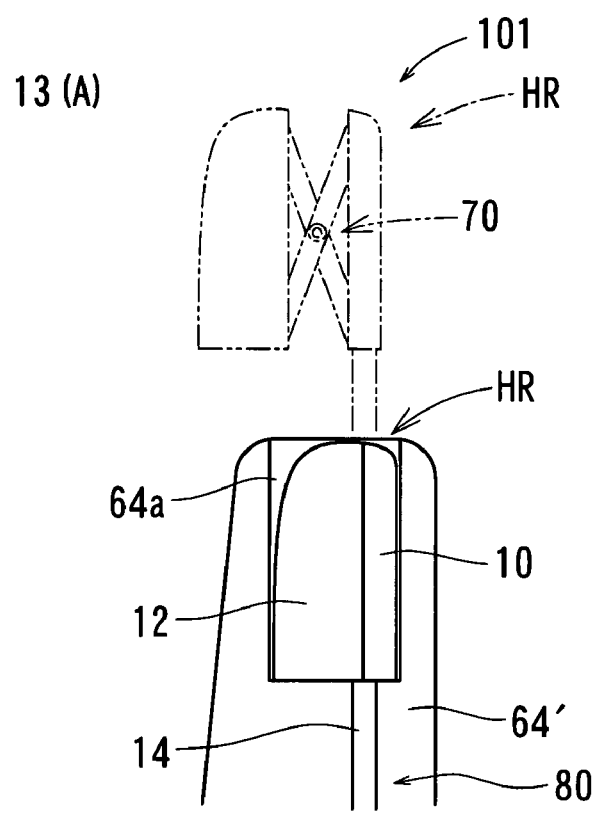
FIG. 13 (A) is a side view of a first modified form of the third embodiment.
Figure 13:
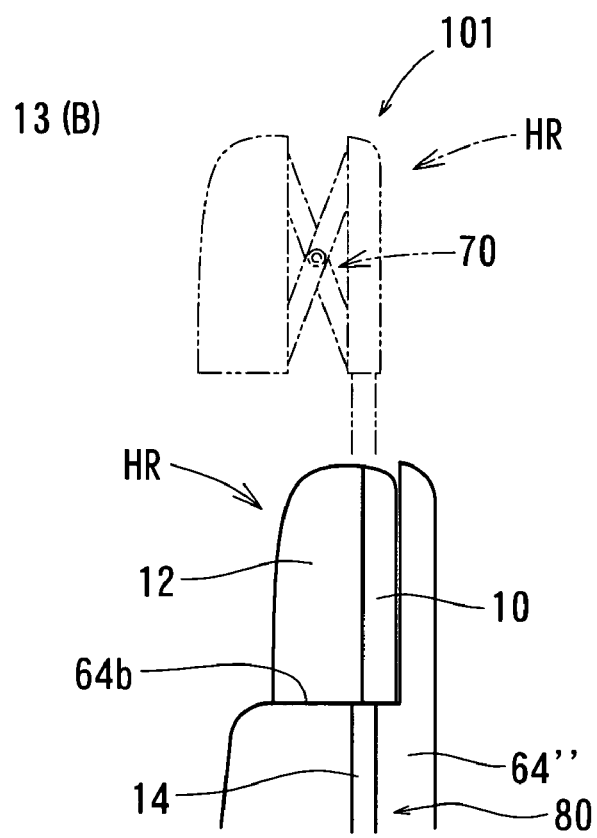

In FIG. 12, a reference F1 corresponds to a flag showing as to whether the signal from the sensor 92 is transmitted to the control unit 90. That is, [F1=1] means that the signal from the sensor 92 is transmitted to the control unit 90. Further, the flag F1 has a default value of zero (0) when the ignition switch is turned ON. Conversely, a reference F2 corresponds to a flag showing as to whether the operation of the second moving mechanism 80 is completed and the operation of the first moving mechanism 70 is then started. That is, [F2=1] means that the operation of the second moving mechanism 80 is completed and the operation of the first moving mechanism 70 is started. Further, the flag F2 also has a default value of zero (0) when the ignition switch is turned ON.

First, in step S1 the control unit 90 determines if the value of F1 is 1 or 0. When the value of F1 is not 1, in step S2 the control unit 90 determines if the detection signal from the sensor 92 is transmitted thereto. If the detection signal from the sensor 92 is not transmitted to the control unit 90, the control process by the control unit 90 is terminated and returned to an initial state (the step S1) so that the control process by the control unit 90 is restarted. To the contrary, if the detection signal from the sensor 92 is transmitted to the control unit 90, in step S3 the control unit 90 changes the value of F1 from 0 to 1. Thereafter, in step S4 the control unit 90 determines if the value of F2 is 1 or 0.

When the value of F2 is not 1, in step S5 the drive motor 82 of the second moving mechanism 80 is actuated so that the head rest main body HR is upwardly moved until the main body HR reaches a desired height. Thereafter, in step S6 the drive motor 82 is deactuated so as to stop the head rest main body HR. Subsequently, in step S7 the actuator 79 of the first moving mechanism 70 is actuated so that the front portion 12 of the head rest main body HR is horizontally moved forwardly. Thereafter, in step S8 the control unit 90 changes the value of F2 from 0 to 1. Thereafter, in step 9 the control unit 90 determines as to whether a distance L between the front portion 12 of the head rest main body HR and the passenger head is not more than a predetermine distance Lr based upon the proximity signals from the proximity sensors 60. If the distance L is more than the predetermined distance Lr, the control process by the control unit 90 is terminated and returned to the initial state (the step S1) so that the control process by the control unit 90 is restarted. To the contrary, if the distance L is not more than the predetermined distance Lr, the actuator 79 of the first moving mechanism 70 is deactuated so that the forward motion of the front portion 12 is stopped. Thus, the control process by the control unit 90 is terminated.

Further, in the control process, when a desired time has elapsed after the control unit 90 determines that the detection signal from the sensor 92 is transmitted thereto, each of the first and second moving mechanisms 70 and 80 is automatically returned to the initial condition so that the head rest 101 is restored to the normal condition (FIG. 9). At this time, each of the values of F1 and F2 is cleared to 0.

The seat back 64 in the third embodiment can be modified, if necessary. For example, as shown in FIG. 13(A), a modified seat back 64' of this embodiment can be formed with a receiving space or recessed portion 64a so that the main body HR of the head rest 101 can be received or retracted therein when the second moving mechanism 80 is in the lowered condition, as shown by a solid line. Further, at this time, the rear portion 10 and the front portion 12 of the main body HR are closed or joined with each other. According to this modified form, because the main body HR can normally be retracted into the seat back 64', the passenger can be freed from a possibly oppressive feeling attributed to the presence of the head rest.

In this modified form, when the vehicle collision is sensed or predicted by the sensor 92, the second moving mechanism 80 is operated so as to shift from the lowered condition to the lifted condition. As a result, as shown by a broken line, the main body HR is upwardly projected from the recessed portion 64a. Thereafter, the first moving mechanism 70 is operated so as to be shifted from the retracted condition to the fully extended condition. As a result, the front portion 12 of the head rest main body HR projects forwardly toward the passenger head in order to protect the passenger head from suffering a whiplash injury.

In addition, as shown in FIG. 13(B), a modified seat back 64" of this embodiment can be formed with a receiving space or shouldered portion 64b so that the main body HR of the head rest 101 can be seated thereon when the second moving mechanism 80 is in the lowered condition, as shown by a solid line.

Further, in the first and second embodiments, the moving mechanism 30 is arranged and constructed such that the front bracket 12A (the front portion 12) can move forwardly and upwardly in the first moving path P1. However, the moving mechanism 30 can be arranged and constructed such that the front bracket 12A can move upwardly only in the first moving path P1.

Moreover, in the first to third embodiments, the moving mechanisms 30 and 130 are arranged and constructed to be operated when a vehicle collision is sensed or predicted by the sensor 92. However, the moving mechanisms 30 and 130 can be arranged and constructed to be operated when the passenger sits on the vehicle seat, thereby previously positioning the head rests 1 and 101 such that the passenger head can be effectively protected when the vehicle actually collides. In such a case, for example, a seatbelt switch is used as the main sensing device so that an on-off signal of the seatbelt switch can be used as the detection signal instead of the signal from the sensor 92. Therefore, for example, in the step S2 in FIG. 12, it is determined as to whether the seatbelt switch is switched on or off.

The invention claimed is:

1. A head rest of a vehicle seat, comprising:
    a main body having a front portion for supporting a head of a passenger and a rear portion that is attached to a head rest stay;
    a moving mechanism that is arranged and constructed to move the main body or the front portion vertically and to move the front portion back and forth; and
    a control device that is arranged and constructed to control motions of the moving mechanism,
    wherein the moving mechanism includes a first moving mechanism for upwardly moving the main body or the front portion and a second moving mechanism for forwardly moving the front portion, and wherein the control device controls the motions of the moving mechanism based upon a detection signal that is generated when a collision is predicted or sensed, so that the second moving mechanism is actuated after the first moving mechanism is actuated.

2. The head rest as defined in claim 1, wherein the moving mechanism interconnects the rear and front portions of the main body, wherein the moving mechanism comprises a back and forth moving mechanism that can move the front portion back and forth, and a vertical moving mechanism that can move the head rest stay vertically relative to a seat back of the vehicle seat, and wherein the control device comprises an electric control unit that is constructed to control the motions of the back and forth moving mechanism and the vertical moving mechanism.

3. A head rest of a vehicle seat, comprising:
a main body having a front portion for supporting a head of a passenger and a rear portion that is attached to a head rest stay;
a moving mechanism tat is arranged and constructed to move the main body or the front portion vertically and to move the front portion back and forth;
a control device that is arranged and constructed to control motions of the moving mechanism; and
a proximity detecting device that is arranged and constructed to detect that the front portion of the main body actually contacts or comes closer to the head of the passenger,
wherein the moving mechanism includes a first moving mechanism for upwardly moving the main body or the front portion and a second moving mechanism for forwardly moving the front portion, wherein a control device controls the motions of the moving mechanism so that the second moving mechanism is actuated after the first moving mechanism is actuated, and wherein the moving mechanism is stopped in response to a representative proximity signal from the proximity detecting device.

4. The head rest as defined in claim 3, wherein the moving mechanism interconnects the rear and front portions of the main body, wherein the moving mechanism comprises a back and forth moving mechanism that can move the front portion back and forth, and a vertical moving mechanism that can move the head rest stay vertically relative to a seat back of the vehicle seat, and wherein the control device comprises an electric control unit that is constructed to control the motions of the back and forth moving mechanism and the vertical moving mechanism.

\* \* \* \* \*